(12) United States Patent
Zhang et al.

(10) Patent No.: US 6,810,489 B1
(45) Date of Patent: Oct. 26, 2004

(54) CHECKPOINT COMPUTER SYSTEM UTILIZING A FIFO BUFFER TO RE-SYNCHRONIZE AND RECOVER THE SYSTEM ON THE DETECTION OF AN ERROR

(75) Inventors: Zheng Zhang, San Jose, CA (US); Manohar Karkal Prabhu, Stanford, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 477 days.

(21) Appl. No.: 09/656,551

(22) Filed: Sep. 6, 2000

(51) Int. Cl.$^7$ .............................. G06F 11/00; G06F 13/28

(52) U.S. Cl. ............................................ 714/6; 711/141

(58) Field of Search ................................ 714/6, 15, 18, 714/20, 16; 717/161, 162; 711/141

(56) References Cited

U.S. PATENT DOCUMENTS

| | | | | |
|---|---|---|---|---|
| 4,740,969 A | * | 4/1988 | Fremont | 714/15 |
| 5,381,545 A | * | 1/1995 | Baker et al. | 714/19 |
| 5,745,672 A | * | 4/1998 | Stiffler | 714/6 |
| 5,828,821 A | * | 10/1998 | Hoshina et al. | 714/15 |
| 5,958,070 A | * | 9/1999 | Stiffler | 714/13 |
| 6,079,030 A | * | 6/2000 | Masubuchi | 714/15 |
| 6,292,880 B1 | * | 9/2001 | Mattis et al. | 711/216 |
| 6,363,494 B1 | * | 3/2002 | Farah | 714/2 |

* cited by examiner

Primary Examiner—Robert Beausoliel
Assistant Examiner—Emerson Puente

(57) ABSTRACT

A fault-tolerant computer system having an application memory organized as a plurality of cache lines, each cache line being identified by an address in the memory. A FIFO buffer stores a plurality of such cache lines. The system includes at least one CPU for executing instructions stored in the application memory. A checkpoint controller defines a series of repeating checkpoint cycles. The application memory and FIFO buffer are operated under the control of a memory controller. The checkpoint controller also has access to a plurality of registers in the CPU that define the state of that CPU at a point in each checkpoint cycle that is controllable by the controller. When the memory controller receives a cache line from the CPU in response to a write command specifying an address A in the application memory at which the cache line is to be stored, a copy of the cache line as stored in the application memory at A is copied into the FIFO buffer upon receiving the first write command specifying A after the start of the current checkpoint cycle. The cache line received in the write command is then used to overwrite the contents of address A in the application memory. At a predetermined point in each checkpoint cycle, the checkpoint controller causes the CPU to write back to the memory all dirty cache lines; and to store its internal registers defining the state of the CPU in the state memory. The checkpoint controller empties the contents of the FIFO buffer at the end of each checkpoint cycle if no error has been detected by the end of the checkpoint phase of the cycle. If an error is detected, the contents of the FIFO buffer are read back into the application memory, and the contents of the state memory are read back into the CPU. The system is then restarted after completing any hardware configuration needed for the restart.

8 Claims, 2 Drawing Sheets

CHECKPOINT COMPUTER SYSTEM UTILIZING A FIFO BUFFER TO RE-SYNCHRONIZE AND RECOVER THE SYSTEM ON THE DETECTION OF AN ERROR

FIELD OF THE INVENTION

The present invention relates to fault tolerant computers, and more particularly, to computer systems that utilize a checkpointing error recovery system to recover from a system failure.

BACKGROUND OF THE INVENTION

Consider a computer system that must function properly for an extended period of time. If an error occurs during the system's operation, the system can, in principle, be restarted from some known point in the operation that precedes the error thereby losing only the time invested in the system operation between the restart point and the point at which the failure occurred.

One type of fault tolerant computer system utilizes a fault detection system that depends on the state of the computer being periodically recorded. For example, U.S. patent application Ser. No. 09/111,250, which is hereby incorporated by reference, describes a fault tolerant computer system in which the state of the computer is recorded in a second "slave" computer. In this system, the master computer stores data in a master memory. The CPU includes at least one cache and reads and writes in cache lines having several words per line. Each time a line is written into master memory, a copy of the line is transferred to the slave memory and a copy of the contents of the slave memory at that location is transferred to a FIFO that is connected to the slave computer. If an error occurs, the contents of the FIFO buffer can be utilized to reconstruct the state of the slave computer's memory at the last checkpoint, and the system is restarted on the slave computer in a state that matches that of the master computer at the end of the last checkpoints At periodic intervals, the slave computer generates, or receives, a checkpoint signal. The signal may be generated internally via an interrupt timer associated with either of the computers, a hardware or software interrupt generated by either computer, or the signal may be generated by hardware that is external to both CPU's. When the checkpoint signal is received by the slave computer, the slave computer stores the contents of its registers in a predetermined location so that the slave can be returned to the state at the checkpoint. Since no errors have occurred since the last checkpoint, the FIFO buffer is merely dumped, and the next computational cycle is begun.

As noted above, if an error occurs in the master computer system and the master computer system cannot recover from the error, program execution is transferred to the slave computer system, which begins execution from the last checkpoint. The slave computer uses the contents of the FIFO buffer to return the slave memory to the state it had at the end of the last checkpoint. At this point, the contents of the master and slave memories are synchronized as of that checkpoint. The slave computer then loads its registers from the register images stored at the end of the last checkpoint interval and picks up where the master computer left off.

While this system provides a high degree of fault tolerance, it is quite expensive, since it requires a second slave computer.

Broadly, it is the object of the present invention to provide an improved checkpoint computer system.

It is a further object of the present invention to provide a checkpoint computer system that operates on a single computer, thereby eliminating the need for a slave computer.

These and other objects of the present invention will become apparent to those skilled in the art from the following detailed description of the invention and the accompanying drawings.

SUMMARY OF THE INVENTION

The present invention is a fault-tolerant computer system having an application memory organized as a plurality of cache lines, each cache line being identified by an address in the memory. A FIFO buffer stores a plurality of such cache lines. The system includes at least one CPU for executing instructions stored in the application memory. The system includes a state memory for storing the contents of the internal registers of the CPU. A checkpoint controller defines a series of repeating checkpoint cycles. The application memory and FIFO buffer are operated under the control of a memory controller. The checkpoint controller also has access to a plurality of registers in the CPU that define the state of that CPU at a point in each checkpoint cycle that is controllable by the checkpoint controller. When the memory controller receives a cache line from the CPU in response to a write command specifying an address A in the application memory at which the cache line is to be stored, a copy of the cache line as stored in the application memory at A is copied into the FIFO buffer upon receiving the first write command specifying A after the start of the current checkpoint cycle. The cache line received in the write command is then used to overwrite the contents of address A in the application memory. At a predetermined point in each checkpoint cycle, the checkpoint controller causes the CPU to cease processing instructions from the application memory; to write back to the memory all dirty cache lines; and to store its internal registers defining the state of the CPU in the state memory. The checkpoint controller empties the contents of the FIFO buffer at the end of each checkpoint cycle if no error has been detected by the end of the checkpoint phase of the cycle. If an error is detected, the contents of the FIFO buffer are read back into the application memory, and the contents of the state memory are read back into the CPU. The system is then restarted after completing any hardware configuration needed for the restart.

DETAILED DESCRIPTION OF THE INVENTION

Figure 1:
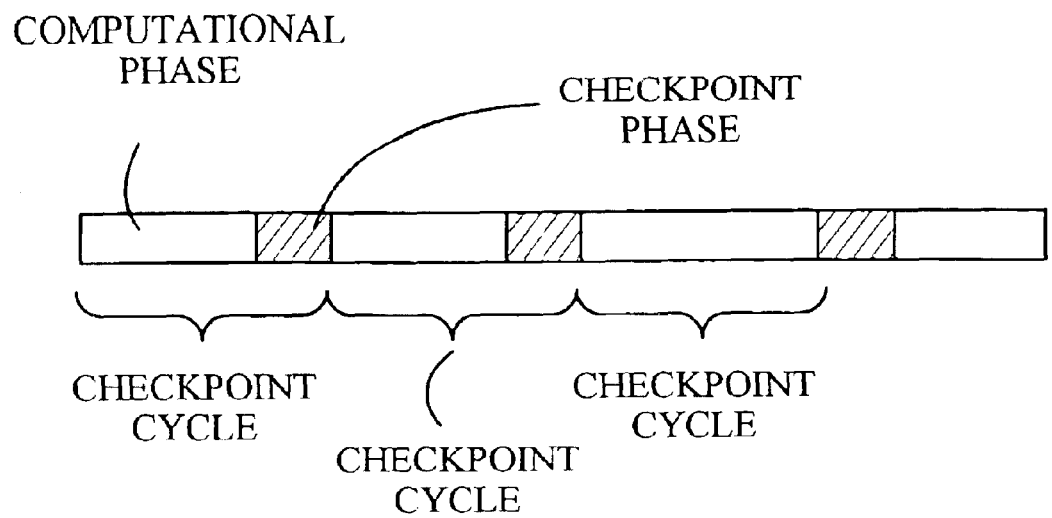
FIGS. 1 and 2 illustrate the various phases of a checkpoint system.

The present invention is a checkpoint system that runs on a single computer thereby providing the advantages of the prior art checkpoint systems discussed above without the added cost of maintaining the slave computer system. Referring to FIG. 1, there are four phases of operation in a checkpoint system. The first two occur during normal operation and the remaining two occur following the detection of a failure event. The first two phases will be referred to as a checkpoint cycle. The phase of a checkpoint cycle in which normal processing occurs is referred to as the computational phase. During the computational phase, maintenance is done in the background to provide the data needed for system recovery in the event of a fault. The other phase of a checkpoint cycle, referred to as the checkpoint phase, corresponds to the time when the machine is brought into a known state that can be re-created as a starting point in the event of a fault. In this state the cache lines are all clean (i.e. synchronized with respect to main memory). During this phase, the internal state of the processing nodes is also brought to a known state and/or recorded.

The other two phases of operation are expected to occur very rarely. They only occur during the recovery period, after a fault has been detected in the system. The first is the recovery phase. The other is the degraded-operation phase, and follows the recovery phase.

Figure 2:
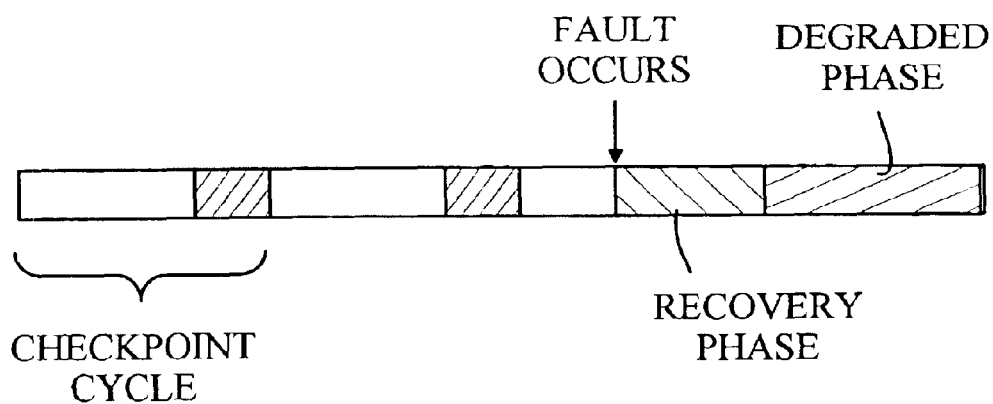

Although FIG. 2 shows the fault occurring during the computational phase, the fault can occur during the checkpoint phase as well.

The process of checkpointing allows the machine to backtrack to a previously consistent machine state that existed prior to the fault and from which execution can be resumed. This requires that a copy be kept of the state of the machine at the time of completion of the last checkpoint cycle. This is achieved in the present invention by saving the checkpoint state of the machine in a fault-tolerant memory as changes are made to the main memory between checkpoints. In the simplest embodiment of the present invention, each time a line is written back into the main memory, the contents of the main memory that were displaced by that line are recorded in an undo FIFO buffer. If a fault occurs, the state of the memory at the end of the last checkpoint cycle can be reconstructed by reading out the FIFO and rewriting the main memory from the contents thereof. If no fault occurs during a checkpoint cycle, the contents of the FIFO are merely dumped at the end of the cycle. If the main memory has a number of different nodes, a separate undo FIFO is kept for each memory node to record changes to that memory since the last checkpoint. More sophisticated embodiments of the present invention that require smaller FIFO buffers will be discussed in more detail below.

The checkpoint process must store information sufficient to restore the machine to the state that the machine had at the end of the last checkpoint cycle. In addition to storing the various registers in the machine, the cache memories must be brought to a reproducible state. The preferred method for accomplishing this is to cleanse the cache memories of dirty lines, which are written back to the main memory, and hence, preserved, if necessary. This write back imposes a load on the bus system during the checkpoint phase. In a distributed computing system, all nodes must synchronously perform the checkpoint and complete the checkpoint phase.

Figure 3:
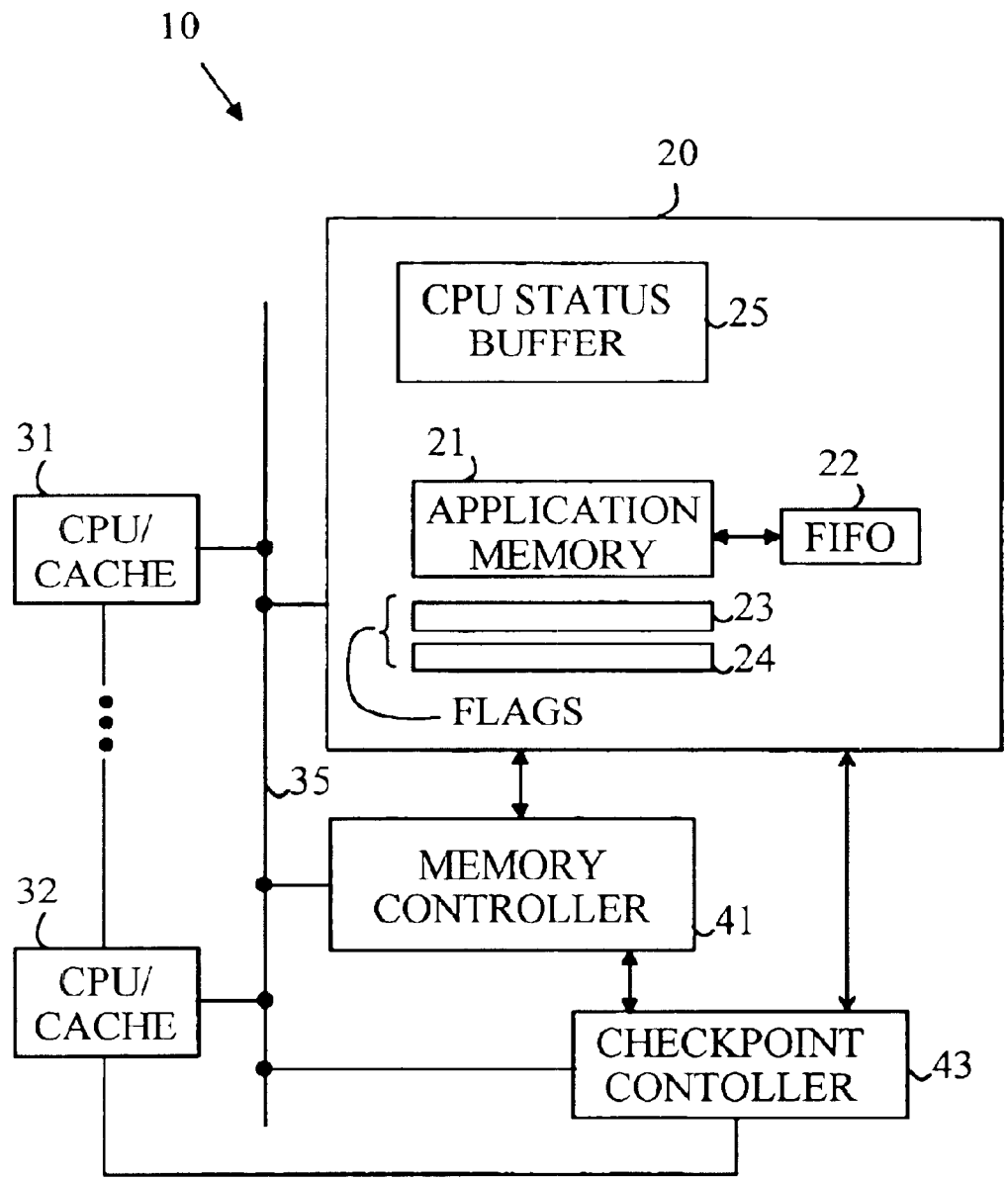
FIG. 3 is a block diagram of a multiprocessor computer 10 having a main memory according to the present invention.

The manner in which the present invention operates in a computer having a single main memory may be more easily understood with reference to FIG. 3, which is a block diagram of a multiprocessor computer 10 having a main memory 20 according to the present invention. Memory 20 stores information for a plurality of processors connected thereto by bus 35. Exemplary processors are shown at 31 and 32. Memory 20 is under the control of controller 41. The timing of the checkpoint cycles is preferably controlled from a checkpoint controller 43 that can be part of controller 41 or a separate unit.

For the purposes of this discussion, it will be assumed that main memory 20 is read and written in units of cache lines and each cache line has appended thereto error correcting bits which can be used by controller 41 to detect and correct errors in the cache line. Since error correcting memories of this type are well known in the art they will not be discussed in detail here. In general, these codes rely on the fact that only a small number of the possible cache lines are possible if no errors are introduced during the storage and retrieval process. For example, in a typical error-correcting code, each 8-bit data word is transformed into a 16 bit storage word. There are only 256 possible data word values; hence, only 256 of the possible 65536 storage word values will be used in the absence of errors. When an error occurs, a valid storage word is usually converted to an invalid storage word. The error correcting system then tries to figure out which valid state would have given rise to the detected invalid state if various numbers of bits were altered by the storage operation. The ability of an error correcting code to correct errors is measured by a quantity referred to as the "Hamming Distance" associated with the code. For example, codes with a Hamming Distance of 5 can detect errors resulting from 4 single-bit errors and correct for all possible 2 single-bit errors. A discussion of error correcting codes may be found in ERROR CORRECTING CODES, 2ND EDITION, by Peterson and Weldon, MIT PRESS, 1972, or in PRACTICAL ERROR DESIGN FOR ENGINEERS, by Neil Glover, Data Systems Technology Corp., 1982.

Main memory 20 is divided into an application memory 21 that is used to store the actual cache lines that are delivered to the various processors and an undo-FIFO buffer 22. In the simplest embodiment of the present invention, each time a cache line is written back into application memory 21, the line displaced by the write back is copied into FIFO 22. At the end of each checkpoint cycle, the state of each of the CPUs is written into a predetermined location 25. This data includes the contents of the various registers within the CPUs. In addition, each processor writes back any dirty cache lines to main memory.

Each time a cache line is read back to main memory, it displaces the contents of one of the cache lines in application memory 21. In this simplest embodiment of the present invention, the displaced cache line is written into FIFO 22. If, at the completion of the checkpoint phase, no faults have been detected, the contents of FIFO 22 are dumped by resetting the appropriate pointer.

If a fault is detected, then the contents of FIFO 22 are written back into application memory 21 during the fault recovery phase to return the application memory to the state it had at the end of the last checkpoint cycle. The various CPUs can then be reloaded from CPU status buffer 25 and the program restarted.

While this simple embodiment of the present invention will operate, it requires a large FIFO 22 or a relatively short checkpoint cycle, since FIFO 22 must be capable of storing all of the displaced cache lines during a single checkpoint cycle. Short checkpoint cycles are to be avoided since the checkpoint overhead is more or less fixed, and hence, the efficiency of the computer system decreases with decreasing checkpoint cycle times. In this regard it should be noted that controller 43 can almost always prevent a FIFO buffer overflow by keeping track of the free space in FIFO 22 and starting a new checkpoint cycle if the free space falls below some predetermined limit.

The size of the FIFO buffer can be significantly reduced by keeping track of which cache lines have copies in FIFO 22. Consider the case in which a cache line at address A is written back into the application memory several times during a single checkpoint cycle. The only copy of the cache line in the FIFO buffer that is of any significance is the one displaced by the first write back. Any subsequent lines for this address will be overwritten during recovery leaving this line in the main memory.

In the preferred embodiment of the present invention, a flag is assigned to each cache line in application memory 21. At the beginning of a checkpoint cycle, the flags are all set to a first state indicating that a write back has not occurred for that cache line. When a line is written back, the flag for that line is examined to determine if a write back has already occurred. If a write back has not occurred, the cache line displaced by the write back is copied into FIFO 22, and the flag is set to indicate that a write back has occurred. If a write back has occurred, the displaced cache line is ignored, as the copy needed for recovery of the memory at the address in question is already in FIFO 22.

At the end of a checkpoint cycle, the various flags must all be reset. Since the number of flags is quite large, the resetting process can take a considerable length of time. Accordingly, in the preferred embodiment of the present invention, two sets of flags are kept as shown at 23 and 24. Each vector has one bit for each cache line in application memory 21. The vectors alternate between two states. During any given checkpoint cycle, only one of the vectors is utilized to keep track of which cache lines have been written back to the main memory. The other vector is reset in the background. Hence, at the end of the checkpoint cycle, the unused vector will be reset and the current vector becomes the vector to reset.

As noted above, the cache memories in each of the processors must be synchronized with the main memory at the end of each checkpoint cycle. The corresponding write back activity can saturate bus 35, and hence, lengthen the checkpoint phase of the cycle. In the preferred embodiment of the present invention, controller 41 tracks the lines within the main memory that are to receive a write back during the current checkpoint cycle. For example, if a processor requests an exclusive copy of a cache line from the main memory, controller 41 knows that a write back for that cache line may occur sometime between now and the end of the current checkpoint cycle. If and when the write back occurs, the contents of the memory at that cache line would be read into FIFO 22 if that cache line had not already received a write back. In the preferred embodiment of the present invention, controller 41 does not wait for the write back to actually occur before copying the current contents of application memory 21 at that cache line into FIFO 22 and setting the corresponding flag. If a copy is to be made, i.e., the corresponding cache line flag was not already set, controller 41 copies the contents of the cache line from the main memory into FIFO 22 during the computational phase of the checkpoint cycle, thereby reducing the load during the checkpoint phase.

The above-described embodiments of the present invention utilize a fault-tolerant memory. However, it will be obvious to those skilled in the art from the preceding discussion that embodiments that utilize conventional memory can also be utilized. Such embodiments are not preferred, however, because they cannot recover from memory errors.

While the above-described embodiments have utilized conventional memory for the shared memory, it should be noted that the present invention could be utilized with all forms of memory including disk drives and the like. Embodiments in which the FIFO buffer and/or flag buffers are kept in separate memories can also be practiced without departing from the teachings of the present invention.

The above-described embodiments of the present invention utilize a scheme in which memory is read and written in blocks consisting of cache lines. However, it will be obvious to those skilled in the art from the preceding discussion that the present invention can be implemented using other types of storage blocks.

As noted above, the present invention stores the state of the machine at the end of each checkpoint cycle. In some hardware configurations such as wave pipelined processors, the status of the machine is not always available in the registers that can be accessed by the checkpoint controller. In such configurations, the checkpoint data on the machine status must be taken at a time when the data is available. Hence, the end of the checkpoint cycle may include the insertion of "no-ops" to flush the pipeline prior to reading the appropriate machine registers so that the machine is in a known state that is ascertainable from the registers.

In the above-described embodiments of the present invention, the machine was merely restarted from the checkpoint data after the detection of a fault. However, it will be obvious to those skilled in the art from the preceding discussion that the machine can also be reconfigured prior to restart. For example, faulty hardware can be eliminated provided the remaining hardware is sufficient to run the program in question.

While the above-described embodiments of the present invention utilized hardware interrupts to initiate a checkpoint cycle, it will be obvious to those skilled in the art from the preceding discussion that software interrupts may also be utilized. Hence, the term "interrupt" as used herein is defined to include both hardware and software interrupts unless the context indicates otherwise.

Various modifications to the present invention will become apparent to those skilled in the art from the foregoing description and accompanying drawings. Accordingly, the present invention is to be limited solely by the scope of the following claims.

What is claimed is:

1. A computer system comprising:
   an application memory organized as a plurality of cache lines, each cache line being identified by an address;
   a FIFO buffer for storing a plurality of cache lines;
   a central processing unit (CPU) for executing instructions stored in said application memory;
   a state memory for storing the contents of the internal registers of said CPU;
   a checkpoint controller for defining a series of repeating checkpoint cycles, said checkpoint controller having access to a plurality of registers in said CPU that define the state of that CPU at a point in each of said checkpoint cycles that is controllable by said checkpoint controller;
   a memory controller for operating said application memory and said FIFO buffer, said memory controller receiving a cache line from said CPU in response to a write command specifying an address A in said application memory at which said cache line is to be stored, wherein a copy of said cache line as stored in said application memory at address A, is copied into said FIFO buffer upon receiving the first write command specifying A after the start of the current checkpoint cycle, said cache line received in said write command replacing the contents of A in said application memory; and
   a plurality of reset flags, each reset flag corresponding to one of said cache lines in said application memory and having a first state indicating that the corresponding cache line in said application memory has been re-written since the start of the current checkpoint cycle and a second state indicating that the corresponding cache line bas not been rewritten since the start of said current checkpoint cycle, the state of said reset flags determining if said memory controller copies the contents of one of said cache lines into said FIFO buffer.

2. The computer system of claim 1 wherein each checkpoint cycle comprises a computational phase and a checkpoint phase and wherein said checkpoint controller during said checkpoint phase causes said CPU to write back to said memory all dirty cache lines; and to store internal registers defining the state of said CPU in said state memory.

3. The computer system of claim 2 wherein said checkpoint controller empties the contents of said FIFO buffer at the end of each checkpoint phase if no error has been detected by the end of said checkpoint phase.

4. The computer system of claim 1 wherein said checkpoint controller, in response to a determination that a processing error has occurred, copies the contents of said FIFO buffer into said application memory, causes said CPU to copy the contents of said state memory into said CPU's internal registers, and restarts said computer system.

5. The computer system of claim 4 wherein said checkpoint controller causes said computer system to be reconfigured before restarting said computer system.

6. The computer system of claim 1 wherein said application memory comprises a fault tolerant memory.

7. The computer system of claim 1 further comprises first and second vectors of flags, each vector being sufficient to provide said plurality of reset flags, said first vector supplying said reset flags in every other checkpoint cycle and said second vector supplying said reset flags in said remaining checkpoint cycles, said vector that is not supplying said reset flags in any give cycle being set to said second state during that cycle.

8. The computer system of claim 1 wherein said memory controller causes a copy of said cache line as stored in said application memory at an address A to be copied into said FIFO buffer upon receiving the first read command specifying A after the start of the current checkpoint cycle if said read command assigns exclusive ownership of said cache line to said CPU.

* * * * *